No. 842,068. PATENTED JAN. 22, 1907.
D. W. BOVEE.
METHOD OF CONSTRUCTING COMPOSITE OR CONCRETE WALLS.
APPLICATION FILED AUG. 12, 1905.
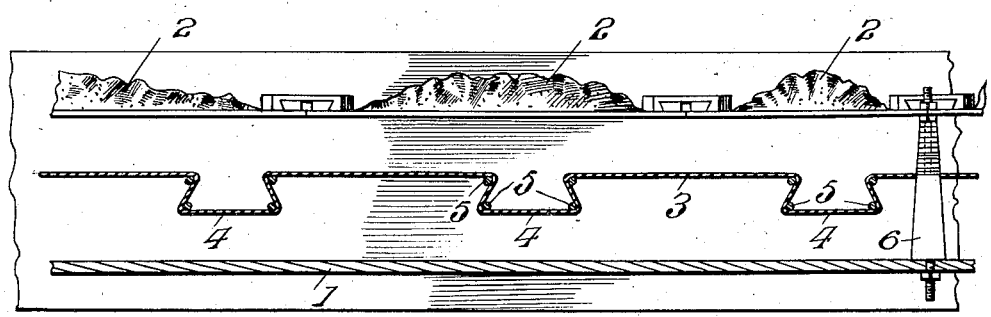
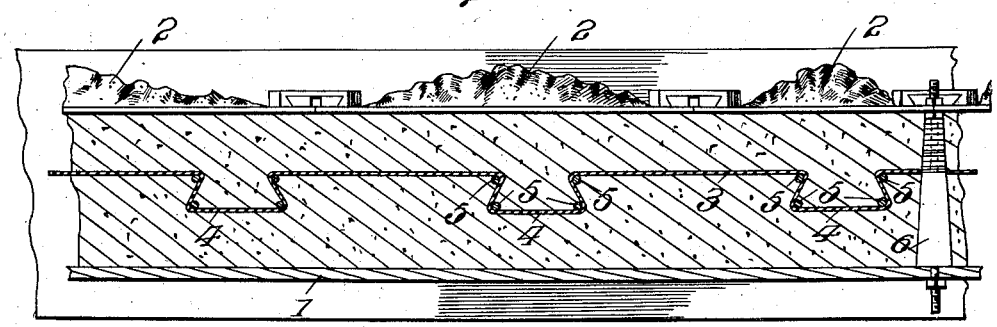
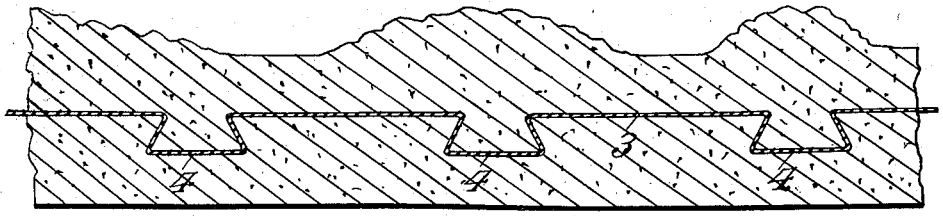

UNITED STATES PATENT OFFICE.

DAVID W. BOVEE, OF WATERLOO, IOWA.

METHOD OF CONSTRUCTING COMPOSITE OR CONCRETE WALLS.

No. 842,068. Specification of Letters Patent. Patented Jan. 22, 1907.

Application filed August 12, 1905. Serial No. 273,996.

*To all whom it may concern:*

Be it known that I, DAVID W. BOVEE, a citizen of the United States, residing at Waterloo, in the county of Blackhawk and State of Iowa, have invented certain new and useful Improvements in Methods of Constructing Composite or Concrete Walls, of which the following is a specification, reference being had therein to the accompanying drawings.

My invention relates to improvements in methods of constructing composite or cement walls, and pertains more particularly to the placing of a waterproof material therein.

The object of my invention is to provide a composite or cement wall having a vertically-disposed sheet of waterproof material, such as roofing-paper, in the center thereof during the manufacture of the wall or block, thus making the wall perfectly water-tight and also preventing the same from sweating on the inside during extreme cold weather, which is usually the result in walls of this character. Another object of my invention is the placing of the paper therein in such a manner that the outer and inner sections thereof are separated by the division of waterproof paper in such a manner that the two separate walls are locked together.

In the accompanying drawings, Figure 1 is a top plan view of a mold for constructing cement walls with the waterproof material therein between the mold-section and the backing and showing means for holding the paper therein. Fig. 2 is a top plan view of the same only showing the cement within the mold on each side of the waterproof paper. Fig. 3 is a top plan view of the completed wall, showing the waterproof material therein.

In carrying out my invention I may use any desired form of mold, either plain or having an outer face to form the appearance of blocks of stone or any other form, as the mold forms no part of my invention.

In walls of cement and other compositions it has been found that moisture often works its way through the same and in cold weather the inner face of the wall is caused to sweat when it is exposed to heat, which is the case of a wall used for the construction of houses, &c. In molding walls of this character I employ a backing 1 and outer mold-sections 2, secured together by bolts 6, and vertically disposed between the same I place a sheet of waterproof material 3, which is preferably the usual roofing-paper, although any other material could be as effectively used.

The sheet of waterproof material, as shown is dovetail at 4, and said dovetail may be placed at any desired distance apart, according to the nature of the wall and its application. In order to support the said waterproof material or paper with the dovetails therein, I provide rods 5, around which the paper is so passed that the dovetails are formed in the paper and held therein. While I have shown this means of forming the dovetails it will be understood that other means could be employed for holding the dovetails in the sheet of waterproof material or the material previously so shaped. The cement or composition is placed on each side of said waterproof divisional plate between the mold-sections and the backing in a plastic state, and when hardened and the mold-sections and backing are removed it will be seen that the outer and inner sections of the wall are positively locked together against lateral movement in respect to each other by the interlocking dovetails.

While I have shown the waterproof material in the dovetail form for interlocking the outer and inner sections of the wall together, it will be understood that the same can be formed in any manner to form interlocking projections for locking the two sections together.

Having thus described my invention, what I claim, and desire to secure by Letters Patent, is—

1. The herein-described method of constructing a cement wall with a layer of waterproof material between the outer and inner surfaces the same consisting in arranging a dovetailed sheet of waterproof paper vertically between the outer and inner walls of the mold-sections and placing the composition in plastic state on each side of said waterproof material for interlocking the inner and outer portions of the wall.

2. The herein-described method of constructing a cement wall with a layer of waterproof material between the outer and inner surfaces of the same, consisting in arranging a sheet of waterproof paper between the outer and inner walls of the mold-sections and placing the composition in plastic state on each side of said waterproof material for interlocking the inner and outer portions of the wall.

3. The herein-described method of constructing a cement wall with a layer of waterproof material between the outer and inner surfaces of the same, consisting in arranging a sheet of waterproof material vertically between the inner and outer walls of the mold-sections, and said sheet having dovetail depressions therein, and placing the composition in plastic state on each side of the said waterproof material for interlocking the inner and outer portions of the wall.

4. The herein-described method of constructing a cement wall with a layer of waterproof material between the outer and inner surfaces of the same, consisting in arranging vertical rods with a sheet of waterproof material arranged around the rods in a dovetail position and placing the composition in a plastic state on each side of the said waterproof material for interlocking the inner and outer portions of the wall.

5. The herein-described method of constructing a cement wall with a layer of waterproof material between the outer and inner surfaces of the same, consisting of arranging a corrugated sheet of waterproof paper vertically between the outer and inner walls of the mold-sections, and placing the composition in a plastic state on each side of said waterproof material for interlocking the inner and outer portions of the wall.

6. The herein-described method of constructing a cement wall with a layer of waterproof material between the outer and inner surfaces of the same, consisting in arranging vertical rods with a sheet of waterproof material arranged around the rods in a dovetail position, placing the composition in a plastic state on each side of the said waterproof material for interlocking the inner and outer portions of the wall and removing the vertical rods while the composition is in a plastic state.

In testimony whereof I affix my signature in presence of two witnesses.

DAVID W. BOVEE.

Witnesses:
JOHN L. FLETCHER,
CHAS. R. WRIGHT, Jr.